United States Patent
Yun et al.

(10) Patent No.: US 9,411,469 B2
(45) Date of Patent: *Aug. 9, 2016

(54) TOUCH SCREEN DEVICE, AND DRIVING DEVICE AND DRIVING METHOD FOR TOUCH PANEL USING PREDETERMINED WAVEFORMS

(71) Applicant: ZINITIX, Daejeon (KR)

(72) Inventors: Il Hyun Yun, Daejeon (KR); Hyung Cheol Shin, Daejeon (KR)

(73) Assignee: ZINITIX, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,514

(22) Filed: Aug. 18, 2015

(65) Prior Publication Data

US 2015/0355785 A1 Dec. 10, 2015

Related U.S. Application Data

(63) Continuation of application No. 13/761,117, filed on Feb. 6, 2013, now Pat. No. 9,141,239.

(60) Provisional application No. 61/596,134, filed on Feb. 7, 2012.

(51) Int. Cl.
*G06F 3/044* (2006.01)
*G06F 3/041* (2006.01)

(52) U.S. Cl.
CPC .............. *G06F 3/0418* (2013.01); *G06F 3/044* (2013.01); *G06F 3/0416* (2013.01)

(58) Field of Classification Search
CPC ........................................... H03K 2217/96011
See application file for complete search history.

(56) References Cited

U.S. PATENT DOCUMENTS

| | | | | |
|---|---|---|---|---|
| 5,905,489 | A * | 5/1999 | Takahama | G06F 3/044 345/156 |
| 2011/0090173 | A1* | 4/2011 | Huang | G06F 3/044 345/174 |
| 2012/0256869 | A1* | 10/2012 | Walsh | G06F 3/0416 345/174 |
| 2012/0268142 | A1* | 10/2012 | Kremin | G06F 3/044 324/658 |
| 2013/0176269 | A1* | 7/2013 | Sobel | G06F 3/0416 345/174 |

FOREIGN PATENT DOCUMENTS

| | | |
|---|---|---|
| KR | 10-2009-0043807 A | 5/2009 |
| KR | 10-2010-0038590 A | 4/2010 |
| KR | 10-2010-0042903 A | 4/2010 |

* cited by examiner

*Primary Examiner* — Ryan A Lubit

(57) ABSTRACT

A driving circuit outputs driving waveforms to operation signal lines. The waveforms are formed by combining a first-mode waveform for charging a node capacitor with a positive voltage and a second-mode waveform for charging the node capacitor with a negative voltage in a predetermined binary sequence. A sensing circuit is electrically connected with a plurality of sense signal lines and measures sense voltages delivered to one integration capacitor from a plurality of node capacitors which are electrically connected with the sense signal lines. A sense detector adds or subtracts the sense voltages which are measured by the sensing circuit at driving time points to measure capacitances of the node capacitors. Accordingly, an autocorrelation technique which is generally used in communication systems is applied to driving a touch screen device.

13 Claims, 11 Drawing Sheets

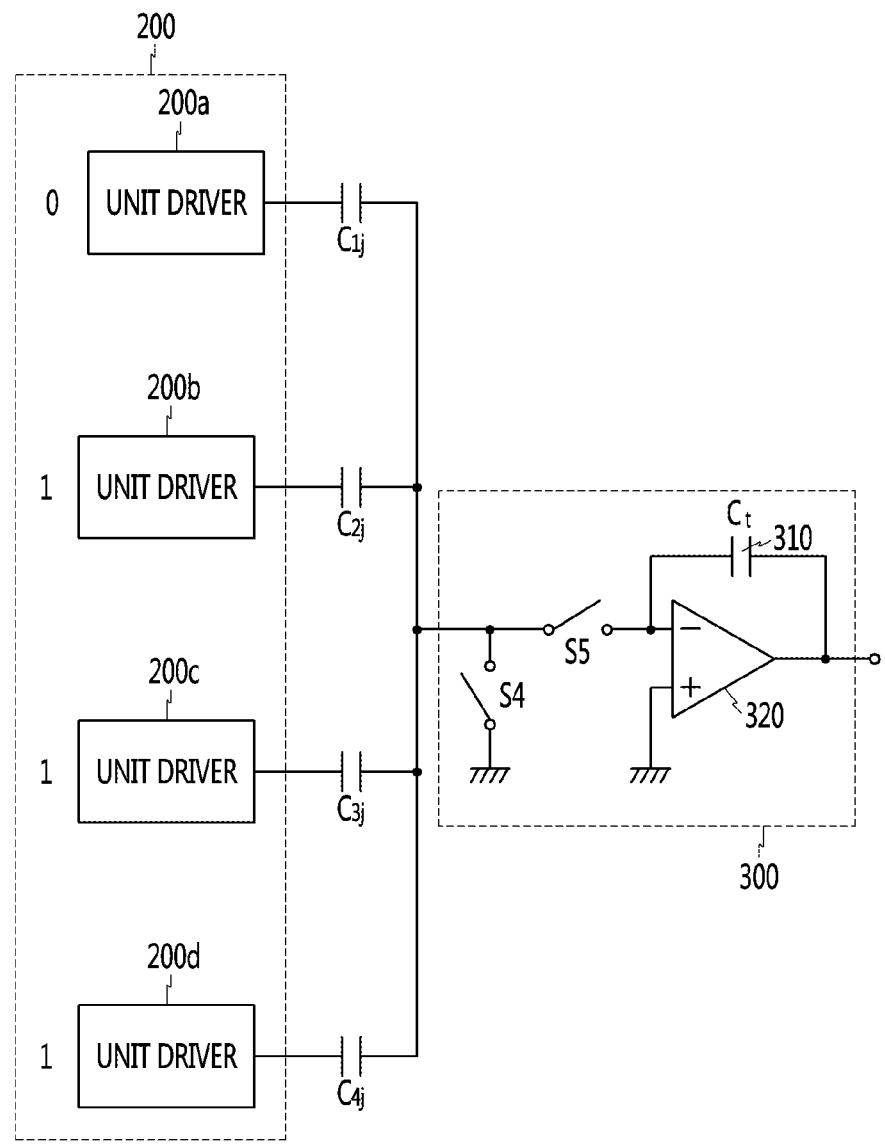

t=t₂ t=t₃ t=t₄

TOUCH SCREEN DEVICE, AND DRIVING DEVICE AND DRIVING METHOD FOR TOUCH PANEL USING PREDETERMINED WAVEFORMS

CROSS-REFERENCE TO RELATED APPLICATION

The present application is a continuation of U.S. patent application Ser. No. 13/761,117 filed on Feb. 6, 2013, which claims priority to and the benefit of U.S. Patent Application No. 61/596,134 filed in the USPTO on Feb. 7, 2012, the entire contents of which are incorporated herein by reference.

BACKGROUND OF THE INVENTION

The present invention relates to touch screen devices, and driving devices and driving methods for a touch panel, and in particular, to a touch screen device, and a driving device and driving method for a touch panel having advantages of reducing a driving time.

Display devices such as a liquid crystal display (LCD) and an organic light emitting display (OLED), portable communication devices, and information processing devices perform functions using various input devices. Recently, touch screen devices are being widely used as input devices in electronic devices such as cell phones, smart phones, palm-size personal computers (PCs), and automated teller machines (ATMs).

Touch screen devices perform desired commands by recognizing an input such as a finger, a touch pen, or a stylus on screens of the touch screen devices to write text, draw shapes, or select and execute icons.

Touch screen devices may resistive type or capacitive type touch screen devices depending on the method employed to sense inputs.

A resistive type touch screen device has a configuration where a glass or transparent plastic plate is coated with resistive material and then is covered with a polyester film. The resistive type touch screen device detects resistance variation to sense a touch point when the screen is touched. Resistive type touch screen devices have a drawback of being incapable of sensing a touch when touch pressure is weak.

A capacitive type touch screen device has electrodes on both or one side of a glass or transparent plastic plate and applies a voltage between the electrodes. The capacitive type touch screen device analyzes capacitance variation to sense a touch point when an object such as a finger touches the screen of the capacitive type touch screen device.

The capacitive type touch screen device requires a driving device for measuring capacitance between the electrodes and sensing capacitance variation to sense a touch point. Such a driving device includes a driving circuit for driving respective node capacitors and a sensing circuit for sensing capacitance variations of the respective node capacitors.

Typical driving devices for a touch panel sequentially drive respective node capacitors and then sequentially measure capacitance variations of the node capacitors. Accordingly, conventional driving devices suffer from a problem in that a driving time for sensing a touch point is long. Also, external noise causes touch panels to malfunction.

The above information disclosed in this Background section is provided to enhance understanding of the background of the invention, and therefore it may contain information that may not be prior art.

SUMMARY OF THE INVENTION

The present invention relates to a touch screen device, and a driving device and driving method for a touch panel which may have the advantages of reducing a driving time and preventing malfunctions caused by external noise.

An exemplary embodiment of the present invention provides a touch screen device including a touch panel comprising a plurality of operation signal lines, a plurality of sense signal lines insulated from the plurality of operation signal lines, and a plurality of node capacitors formed by the plurality of operation signal lines and the plurality of sense signal lines; a driving circuit configured to output waveforms to the plurality of operation signal lines, the waveforms being formed by combining a first-mode waveform for charging a first portion of the plurality of capacitors with a positive voltage and a second-mode waveform for charging a second portion of the plurality of capacitors with a negative voltage according to predetermined binary sequences; a sensing circuit electrically connected to the plurality of sense signal lines and configured to measure sense voltages transmitted from the plurality of node capacitors to one integration capacitor, the plurality of node capacitors being electrically connected with the sense signal lines; and a sense detector for performing addition and subtraction operations on the sense voltages in the predetermined binary sequences and measuring capacitances of the node capacitors.

Another embodiment of the present invention provides a driving device for a touch panel including a plurality of operation signal lines, a plurality of sense signal lines insulated from the plurality of operation signal lines, and a plurality of node capacitors formed by the plurality of operation signal lines and the plurality of sense signal lines. The driving device includes: a driving circuit for outputting driving waveforms to the plurality of operation signal lines, the driving waveforms being formed by combining a first-mode driving waveform for charging the plurality of capacitors with a positive voltage and a second-mode waveform for charging the plurality of capacitors with a negative voltage in predetermined binary sequences; a sensing circuit electrically connected to the plurality of sense signal lines for measuring sense voltages delivered from the plurality of node capacitors to an integration capacitor, the plurality of node capacitors being electrically connected with the sense signal lines; and a sense detector for adding or subtracting the sense voltages in the predetermined binary sequences to measure capacitances of the node capacitors.

Yet another embodiment of the present invention provides a method of driving a touch panel including a plurality of operation signal lines, a plurality of sense signal lines insulated from the plurality of operation signal lines, and a plurality of node capacitors formed by the plurality of operation signal lines and the plurality of sense signal lines. The method may include outputting waveforms to the plurality of operation signal lines, the waveforms being formed by combining a first-mode waveform for charging the plurality of capacitors with a positive voltage and a second-mode waveform for charging the plurality of capacitors with a negative voltage in predetermined binary sequences; measuring sense voltages delivered from the plurality of node capacitors to an integration capacitor, the plurality of node capacitors being electrically connected with the sense signal lines; and adding or subtracting the sense voltages in the predetermined binary sequences to measure capacitances of the node capacitors.

The present invention applies autocorrelation, which is commonly used in communication systems, to the driving mechanism of a touch screen device, thereby reducing a driving time of the touch screen device and preventing malfunctions of the touch screen device caused by external noise.

BRIEF DESCRIPTION OF THE DRAWINGS

FIGS. 8A to 8D are drawings illustrating a method of driving the touch screen device according to an exemplary embodiment of the present invention.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways without departing from the spirit or scope of the present invention. In the following description, terms are used only to explain specific exemplary embodiments without limiting the present invention. Unless otherwise indicated, terms of a singular form may include plural forms.

According to an exemplary embodiment of the present invention, aspects of autocorrelation, which is generally used in communication systems, are applied to driving of a touch screen device, thereby reducing influence of external noise and a driving time.

In general, the concept of autocorrelation is the cross-correlation between a signal transmitted by a transmission side and a signal received by a reception side. In a communication system using autocorrelation, the reception side has signal characteristics of the transmission side which are known in advance, thereby reducing influence of external noises introduced during communication between the transmission side and the reception side. In particular, the transmission side transmits a plurality of signals having binary sequences of 0s and 1s, which are orthogonal to each other, and the reception side performs autocorrelation using the same binary sequences as the transmission binary sequences. Thus, the influence of external noise or other transmitted signals can be removed.

In an embodiment, autocorrelation values can be calculated for a binary sequence. An autocorrelation value relates to the degree to which two sequences are correlated. In an orthogonal sequence, the on-peak autocorrelation value equals the number of values in the sequence, while the off-peak autocorrelation values, which are the values for shifted sequences, are low. The higher the contrast between the correlation for an on-peak sequence and the correlation for an off-peak sequence, the more orthogonal is the sequence. In other words, highly orthogonal sequences are characterized by a high on-peak autocorrelation value and low off-peak autocorrelation values. A highly orthogonal sequence may have an on-peak autocorrelation value of 1, and an off-peak coefficient of 5. Exemplary sequences are Barker sequences, but the present invention is not limited thereto.

A touch screen device according to an exemplary embodiment of the present invention may simultaneously drive a plurality of unit drivers included in a driving circuit for driving a plurality of node capacitors by using binary sequences, and calculate sense voltages delivered by the plurality of node capacitors in the binary sequences at particular time points, thereby removing the influence of external noise and reducing a driving time.

Figure 1:
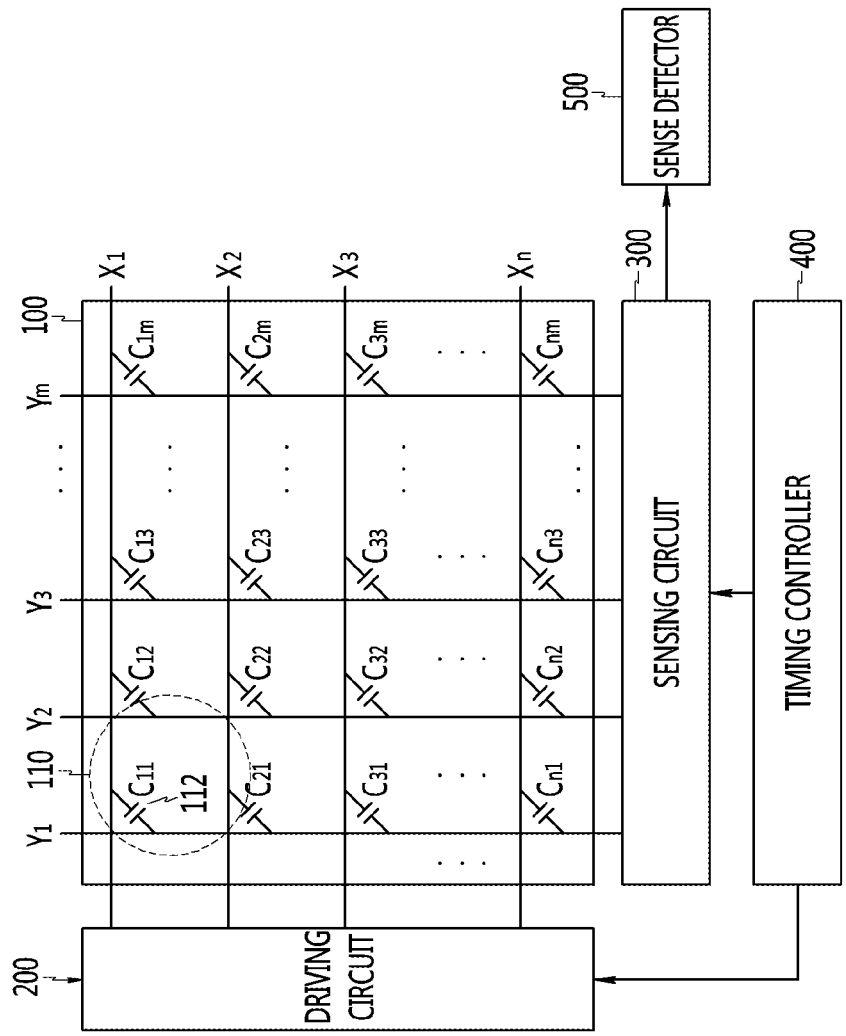
FIG. 1 is a drawing illustrating a touch screen device according to an exemplary embodiment of the present invention.

FIG. 1 illustrates a touch screen device according to an exemplary embodiment of the present invention.

As shown in FIG. 1, a touch screen device according to an embodiment includes a touch panel 100, a driving circuit 200, a sensing circuit 300, a timing controller 400, and a sense detector 500.

The touch panel 100 includes a plurality of operation signal lines X1, X2, X3, ..., Xn and a plurality of sense signal lines Y1, Y2, Y3, ..., Ym, which are insulated from each other. For convenience, in FIG. 1, the operation signal lines and the sense signal lines are depicted as lines. However, in an embodiment the operation signal lines and the sense signal lines are implemented as electrode patterns. In this description, the term "sense signal line" may be used interchangeably with the terms "sense line," "sense electrode," or the like, and the term "operation signal line" may be used interchangeably with the terms "operation line," "operation electrode," or the like. Also, although the plurality of operation signal lines are depicted as being insulated from and intersected with the plurality of sense signal lines in FIG. 1, embodiments of the present invention are not limited thereto. For example, in other embodiments, the operation signal lines may not intersect the sense signal lines.

A sensing node 110 indicating a touch point is defined by a combination of a sense signal line and an operation signal line and includes a node capacitor 112. The node capacitor 112 is formed by the sense signal line and operation signal line which are isolated from each other. In FIG. 1, capacitance of the node capacitor 112 which is formed by an i-th operation signal line and a j-th sense signal line is denoted as Cij. Hereinafter, the capacitance of the node capacitor is simply referred to as "node capacitance."

The driving circuit 200 is electrically connected with the plurality of operation signal lines X1, X2, X3, ..., Xn and applies driving waveforms to the plurality of operation signal lines simultaneously. In an embodiment, the driving waveforms are each formed by a combination of a positive source voltage, a negative source voltage, and a ground voltage. For example, driving waveforms are determined by an on/off operation sequence of driving switches of the driving circuit 200, as described below. In an embodiment, when driving waveforms are driven simultaneously, they may be driven at the same time, even though there may be a measurable time difference between when the waveforms are actually generated, sent, or received.

A driving circuit 200 according to an embodiment of the present invention simultaneously outputs driving waveforms to corresponding operation signal lines X1, X2, X3, ..., Xn. The driving waveforms may be formed by combining a first-mode driving waveform for charging the node capacitor 112 with a positive voltage and a second-mode driving waveform for charging the node capacitor 112 with a negative voltage in predetermined sequences. When the first-mode driving waveform and the second-mode driving waveform indicate "1" and "0", respectively, the driving waveforms which are simultaneously output to the plurality of operation signal lines X1, X2, X3, ..., Xn at any driving time point are represented as a predetermined binary sequence (BS). In other words, the first-mode driving waveform may represent 1's and the second-mode driving waveform may represent 0's, such that when the waveforms are output, they correspond to a sequence of 1's and 0's.

In an embodiment, binary sequences applied to the operation signal lines at different driving time points may be orthogonal to each other. For example, a binary sequence (BS1) applied to the plurality of operation signal lines at driving time point t1 may be orthogonal to a binary sequence (BS2) applied to the plurality of operation signal lines at driving time point t2. In embodiments described herein, for convenience of description, the number of driving time points of the driving circuit is set to the same as the number of operation signal lines X1, X2, X3, . . . , Xn to which the driving waveforms are simultaneously applied.

The sensing circuit 300 is electrically connected to a plurality of sense signal lines Y1, Y2, Y3, . . . , Ym, and measures a sense voltage (SV) of capacitors C1j, C2j, C3j, . . . , Cnj of the plurality of node capacitors 112 corresponding to a sense signal line Yj to which a driving waveform is applied. The sense voltage is proportional to a value obtained by adding (+) and subtracting (−) the capacitances C1j, C2j, C3j, . . . , Cnj corresponding to the sense signal line Yj in a predetermined sequence.

The timing controller 400 outputs a control signal for a driving switch and a control signal for a sensing switch to the driving circuit 200 and the sensing circuit 300, respectively, to control on/off operations of the driving switch of the driving circuit 200 and the sensing switch of the sensing circuit 300.

The sense detector 500 may store the sense voltages (corresponding to calculated capacitances of the plurality of nodes), which are sensed by the sensing circuit 300 at respective driving time points, in a memory (not shown) and then add or subtract the sense voltages (SV1, SV2, . . . , SVn) in predetermined sequences to measure the capacitances of the node capacitors. The sequence of addition and subtraction operations performed by the sense detector 500 may correspond to the sequence of positive and negative voltages from waveforms applied to the operation signal lines.

Hereinafter, a driving circuit 200 and a sensing circuit 300 according to an embodiment of the present invention will be described in detail with reference to FIG. 2.

Driving circuit 200 includes a plurality of unit drivers 200a, 200b, 200c, and 200d applying driving waveforms to the node capacitors C1j, C2j, C3j, and C4j, respectively. While the number of unit drivers is 4 in this embodiment, which is the same as the number of operation signal lines, the number of unit drivers is not limited thereto.

The unit drivers 200a, 200b, 200c, and 200d include a positive source voltage VDD, a negative source voltage −VDD, first driving switches S11, S12, S13, and S14, second driving switches S21, S22, S23, and S24, and third driving switches S31, S32, S33, and S34, respectively. The unit drivers 200a, 200b, 200c, and 200d apply driving waveforms obtained by combining a first-mode driving waveform for applying the positive voltage and a second-mode driving waveform for applying the negative voltage in predetermined sequences.

In an embodiment, the sequences of the driving waveforms applied to node capacitors by the unit drivers 200a, 200b, 200c, and 200d may be orthogonal to each other.

Figure 2:
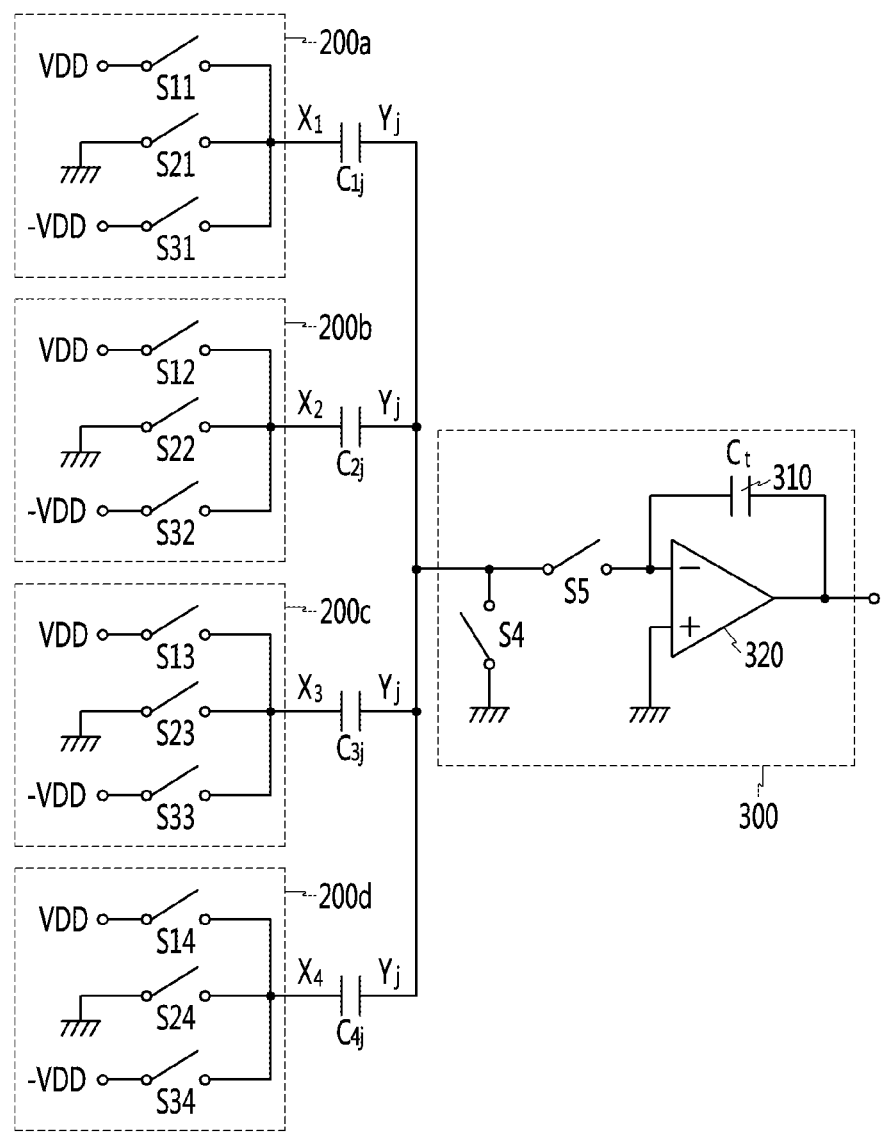
FIG. 2 is a drawing illustrating a driving circuit and a sensing circuit according to an exemplary embodiment of the present invention.

As shown in FIG. 2, the first driving switches S11, S12, S13, and S14 are electrically connected between the positive source voltage VDD and operation signal lines X1, X2, X3, and X4, respectively, which are first ends of the corresponding node capacitors 112. In addition, the second driving switches S21, S22, S23, and S24 are each electrically connected between the ground and the first end of the corresponding node capacitor 112, and the third driving switches S31, S32, S33, and S34 are each electrically connected between the negative source voltage −VDD and the first end of the corresponding node capacitor 112.

According to an embodiment of the present invention, driving waveforms are output to the operation signal lines X1, X2, X3, and X4 on the basis of on/off operations of the first driving switches S11, S12, S13, and S14, the second driving switches S21, S22, S23, and S24, and the third driving switches S31, S32, S33, and S34, respectively. The driving waveforms are obtained by combining a first-mode driving waveform corresponding to a combination of the positive source voltage VDD and the ground voltage, and a second-mode driving waveform which corresponds to a combination of the negative source voltage −VDD and the ground voltage, in predetermined sequences.

The sensing circuit 300 includes first and second sensing switches S4 and S5, an integration capacitor 310, and an amplifier 320.

The first sensing switch S4 is electrically connected between the ground and sense signal line Yj, which is the second end of the node capacitors C1j, C2j, C3j, and C4j.

The amplifier 320 is a differential amplifier, where an inverting terminal coupled to the common second end of the node capacitors is electrically connected with a sense signal line Yj, and a non-inverting terminal is connected to the ground. While a typical operational amplifier (OP AMP) will be described below as an example of the amplifier 320, the scope present invention is not limited thereto. For example, in other embodiments, other differential amplifiers may be used as the amplifier 320.

The integration capacitor 310 is electrically connected between the output terminal and the inverting terminal of the amplifier 320. That is, the integration capacitor 310 allows an output of the amplifier 320 to be fed back to the inverting terminal of the amplifier 320 (negative feedback).

The second sensing switch S5 is electrically connected between the common second end of the node capacitors C1j, C2j, C3j, and C4j and the integration capacitor 310 (that is, the inverting terminal of the amplifier 320). The position of sensing switch S5 determines whether voltages corresponding to calculated values of voltages charged in the node capacitors C1j, C2j, C3j, and C4j are delivered to the integration capacitor.

An operation of a unit driver according to an exemplary embodiment of the present invention will be described below with reference to FIGS. 3 to 7.

Although only an operation of a first unit driver 200a will be described below for convenience, in the embodiments below, it can be assumed that other unit drivers 200b, 200c, and 200d operate the same as the first unit driver 200a.

A method of driving the unit driver 200a according to an embodiment of the present invention includes an operation in a first drive mode for applying a positive voltage VDD to a node capacitor and an operation in a second drive mode for applying a negative voltage −VDD to the node capacitor.

Figure 3:
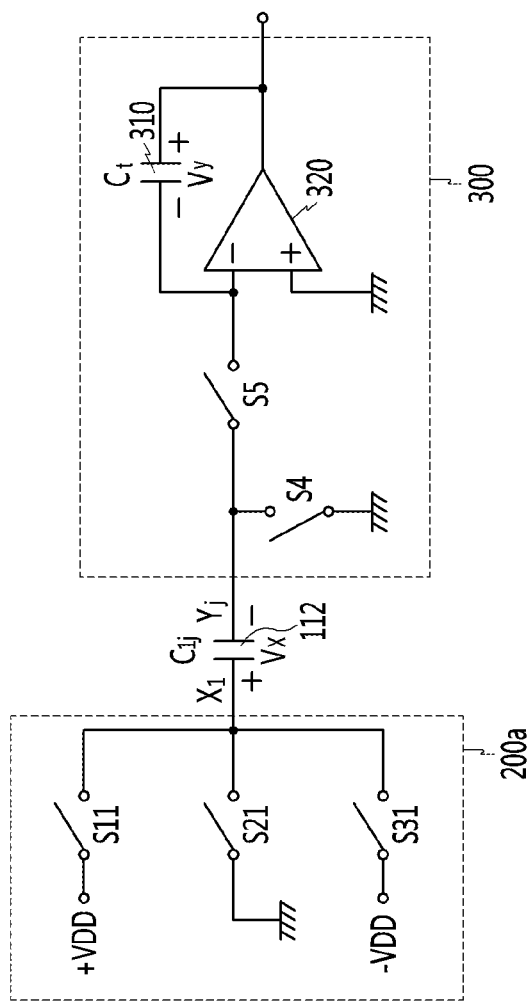
FIGS. 3 to 7 are drawings illustrating a method of driving a unit driver according to an exemplary embodiment of the present invention.

First, the operation in the first drive mode will be described below with reference to FIGS. 3 to 5. FIG. 3 shows an exemplary circuit, with all switches open, which may be an initial state in a device.

In the first drive mode, a third operation switch S31 is open, and a node capacitor 112 is charged or discharged according to on/off operations of the other switches S11, S21, S4, and S5.

Figure 4:
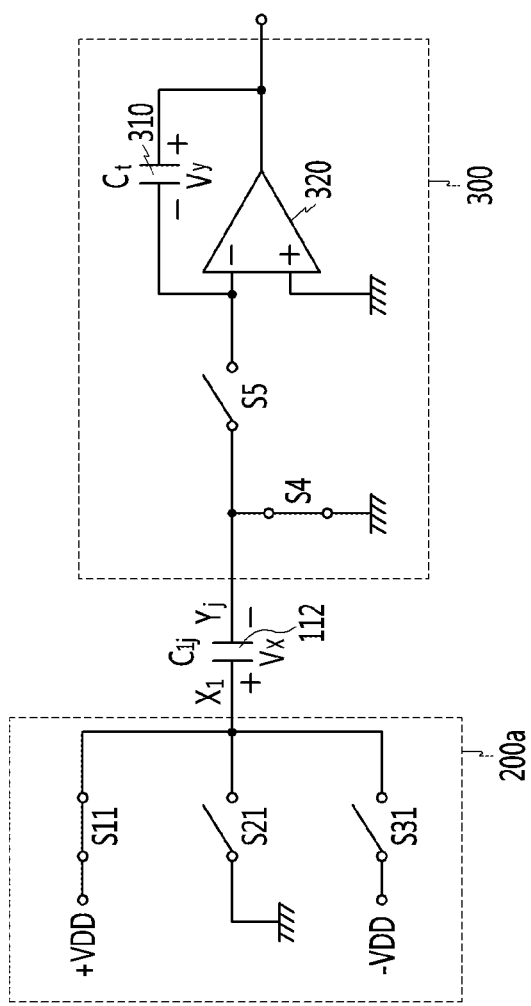

For the charging operation of the node capacitor 112, as shown in FIG. 4, a first driving switch S11 and a first sensing switch S4 are turned on, and a second driving switch S21 and a second sensing switch S5 are turned off. In this configuration, the voltage Vx across the node capacitor 112 is charged to the positive source voltage VDD.

Subsequently, a discharging operation of the node capacitor 112 is performed. As shown in FIG. 5, the first driving switch S11 and the first sensing switch S4 are turned off, and the second driving switch S21 and the second sensing switch S5 are turned on. In this configuration, the voltage Vx across the node capacitor 112 is discharged to ground, and a voltage Vy across the integration capacitor 310 is charged (delivered) with a unit charging voltage Vd. The unit charging voltage Vd may be determined by equation 1.

$$Vd = \frac{C1j}{Ct} * VDD \quad \text{(Equation 1)}$$

where Vd is a unit charging voltage, C1j is a capacitance of the node capacitor formed by a first drive signal line and a j-th sense signal line, Ct is a capacitance of the integration capacitor, and VDD is the source voltage.

In the first drive mode, the node capacitor 112 is charged to positive source voltage VDD in a first charging operation, and the integration capacitor 310 is charged to unit charging voltage Vd, which is proportional to the capacitance C1j of the node capacitor 112, when node capacitor 112 is discharged.

Figure 5:
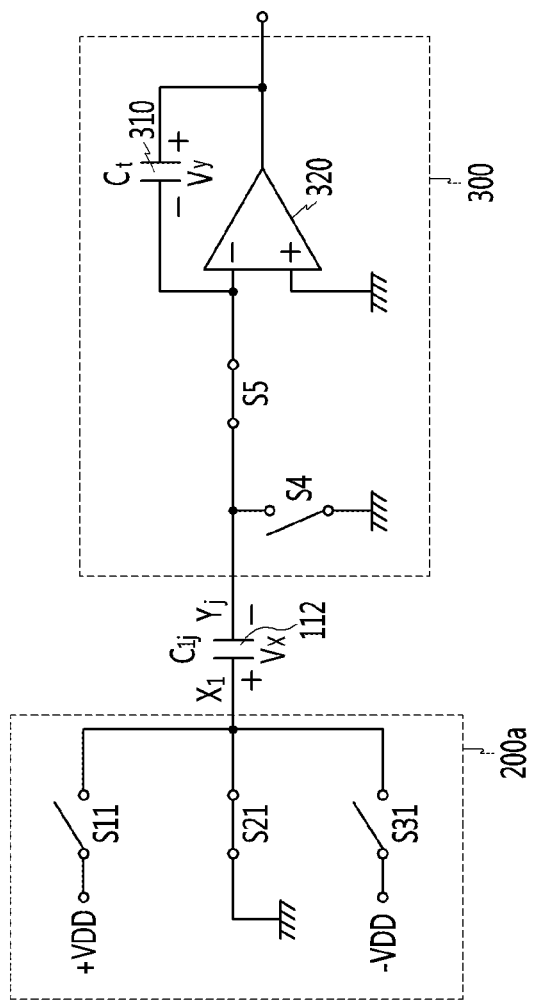

In an exemplary driving mode, as seen in FIG. 4 and FIG. 5, both of the node capacitor 112 and the integration capacitor 310 are charged in sequential operations. The node capacitor 112 is charged first, and the charge is transferred, or delivered, to integration capacitor 310.

Charging and discharging operations in the second drive mode will now be described with reference to FIGS. 6 and 7.

In the second drive mode, the first operation switch S11 is kept off, and the node capacitor 112 is charged or discharged according to on/off operations of the other switches S21, S31, S4, and S5.

Figure 6:
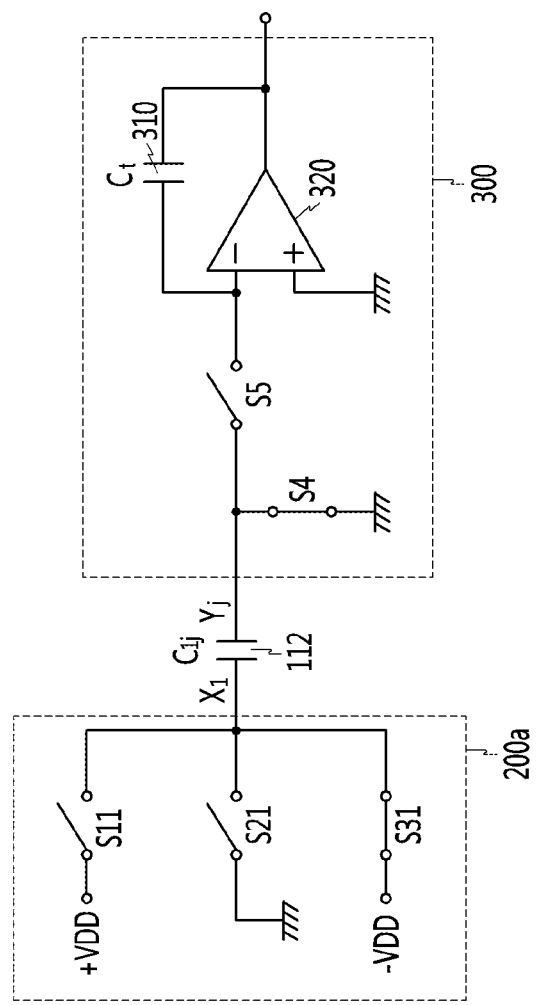
Figure 7:
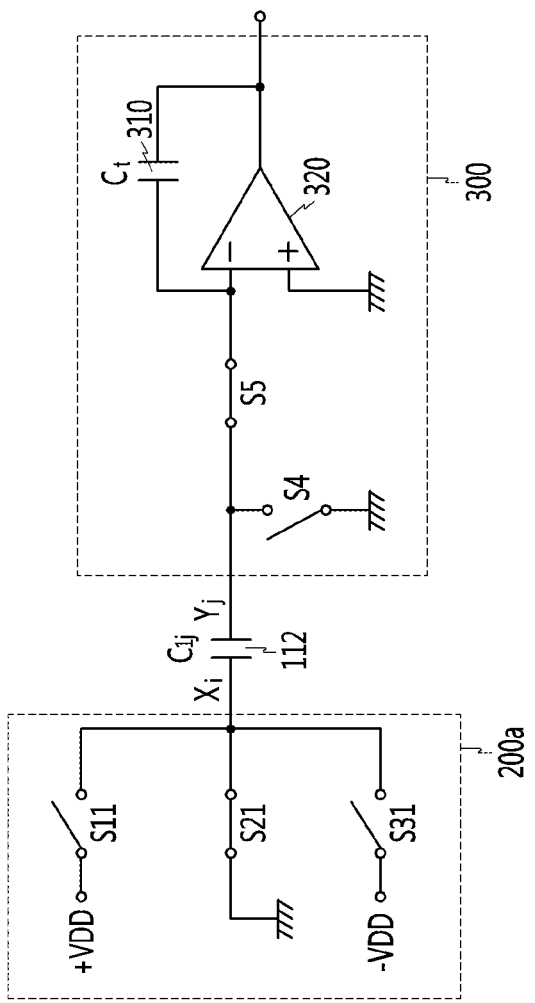

For the charging operation of the node capacitor 112, as shown in FIG. 6, the third driving switch S31 and the first sensing switch S4 are turned on, and the second driving switch S21 and the second sensing switch S5 are turned off. In this case, the voltage Vx across the node capacitor 112 is charged to the negative source voltage −VDD.

Subsequently, a discharging operation of the node capacitor 112 is performed. As shown in FIG. 7, the third driving switch S31 and the first sensing switch S4 are turned off, and the second driving switch S21 and the second sensing switch S5 are turned on. In this configuration, the voltage Vx across the node capacitor 112 is discharged to the ground voltage, and the voltage Vy across the integration capacitor 310 is charged (delivered) with a negative unit charging voltage Vd. In an embodiment, the voltage Vd is determined by equation 1.

In the second drive mode, the node capacitor 112 is charged to the negative source voltage −VDD in a first charging operation, and the integration capacitor 310 is charged to unit charging voltage Vd, which is proportional to the capacitance C1j of the node capacitor 112, when node capacitor 112 is discharged.

As is apparent from the above description, in an embodiment, first mode and second mode driving operations are similar. A difference between the operations is whether node capacitor 112 is charged with voltage +VDD when switch S11 is closed in the first mode, or voltage −VDD when switch S31 is closed in the second mode. In another embodiment, the switching operations of the first and second modes are the same.

A method of driving a touch screen device according to an embodiment of the present invention will be described below with reference to FIGS. 8a to 8d.

According to an embodiment of the present invention, respective unit drivers 200a, 200b, 200c, and 200d are driven by combining the first drive mode and the second drive mode to create a predetermined sequence. As shown in FIGS. 8a to 8d, the first drive mode for applying positive source voltage +VDD to a node capacitor 112 is depicted as "1", and the second drive mode for applying the negative source voltage −VDD to a node capacitor 112 is depicted as "0". In other words, when a unit driver 200 has the number "1" in front of it, it uses the first drive mode to charge the corresponding node capacitor 112 with voltage +VDD, and when a unit driver 200 has a "0" in front of it, it uses the second drive mode to charge the corresponding node capacitor 112 with voltage −VDD.

According to an embodiment of the present invention, driving waveforms which are simultaneously output to the plurality of operation signal lines X1, X2, X3, and X4 at any driving time point may be represented as a predetermined binary sequence (BS). As shown in FIGS. 8a to 8d, a binary sequence (BS1) of driving waveforms driving the unit drivers 200a, 200b, 200c, and 200d at driving time point t1 is "0111", a binary sequence (BS2) of driving waveforms at driving time point t2 is "1011", a binary sequence (BS3) of driving waveforms at driving time point t3 is "1101", and a binary sequence (BS4) of driving waveforms at driving time point t4 is "1110". That is, according to an exemplary embodiment of the present invention, a binary sequence at a given driving time point can be obtained by shifting a binary sequence of the previous driving time point by a single place.

In an embodiment, different binary sequences (BS1, BS2, BS3, and BS4) applied to the operation signal lines at different driving time points may be orthogonal. For example, "0111", which is the binary sequence (BS1) simultaneously applied to four operation signal lines at driving time point t1, is orthogonal to "1011", which is a binary sequence (BS2) simultaneously applied to the four operation signal lines at driving time point t2.

Also, according to an exemplary embodiment of the present invention, the unit driver 200a is sequentially driven in the order of "0, 1, 1, and 1" (binary sequence "0111") at driving time points t1, t2, t3, and t4, respectively, the unit driver 200b is sequentially driven in the order of "1, 0, 1, and 1" (binary sequence "1011"), the unit driver 200c is sequentially driven in the order of "1, 1, 0, and 1" (binary sequence "1101"), and the unit driver 200d is sequentially driven in the order of "1, 1, 1, and 0" (binary sequence "1110").

As shown in FIG. 8a, the unit drivers 200a, 200b, 200c, and 200d are driven according to the binary sequence 0, 1, 1, and 1 at driving time point t1, respectively, and thus the corresponding node capacitors are charged with −VDD, VDD, VDD, and VDD.

In this case, a sense voltage (SV1) which is delivered from respective node capacitors 112 to the integration capacitor 310 at t1 may be obtained by equation 2.

$$SV1 = \frac{VDD}{Ct} * (-C1j + C2j + C3j + C4j) = \quad \text{(Equation 2)}$$
$$k * (-C1j + C2j + C3j + C4j)$$

where k is a constant of VDD/Ct.

Figure 8B:
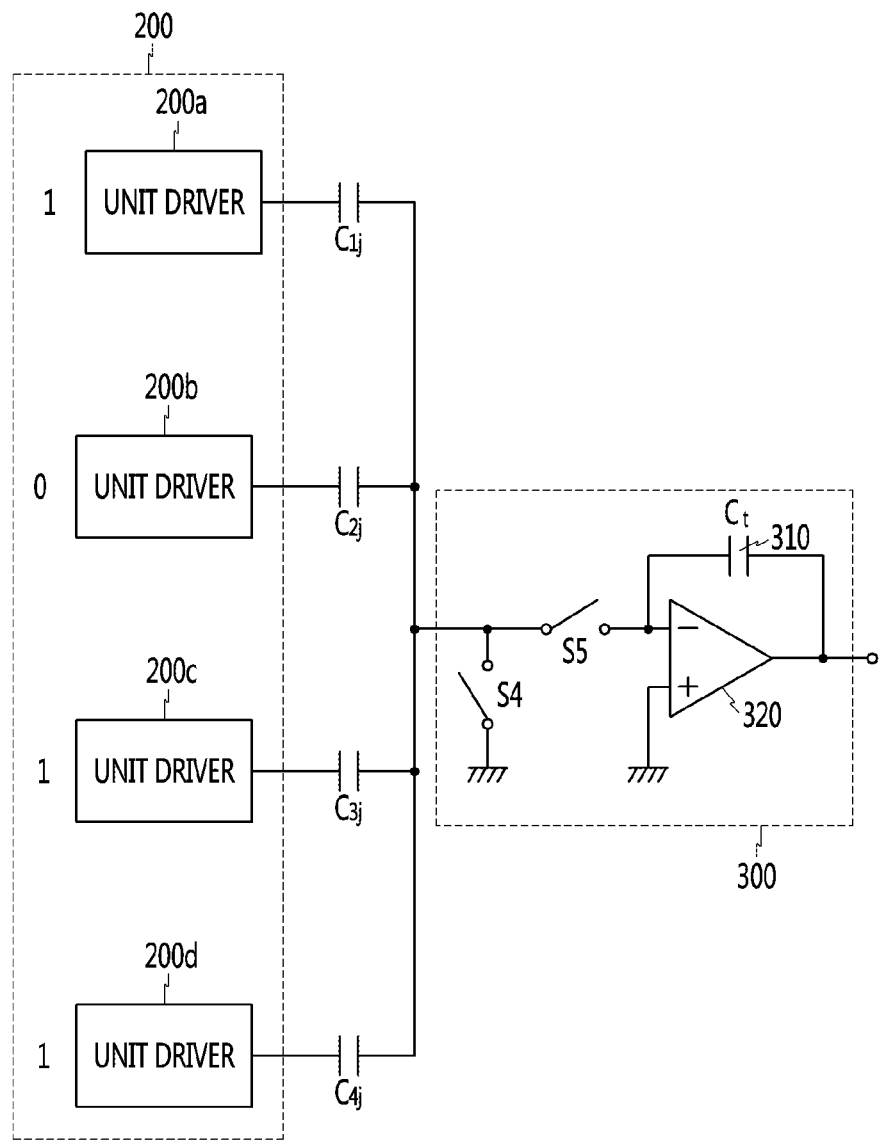
Figure 8C:
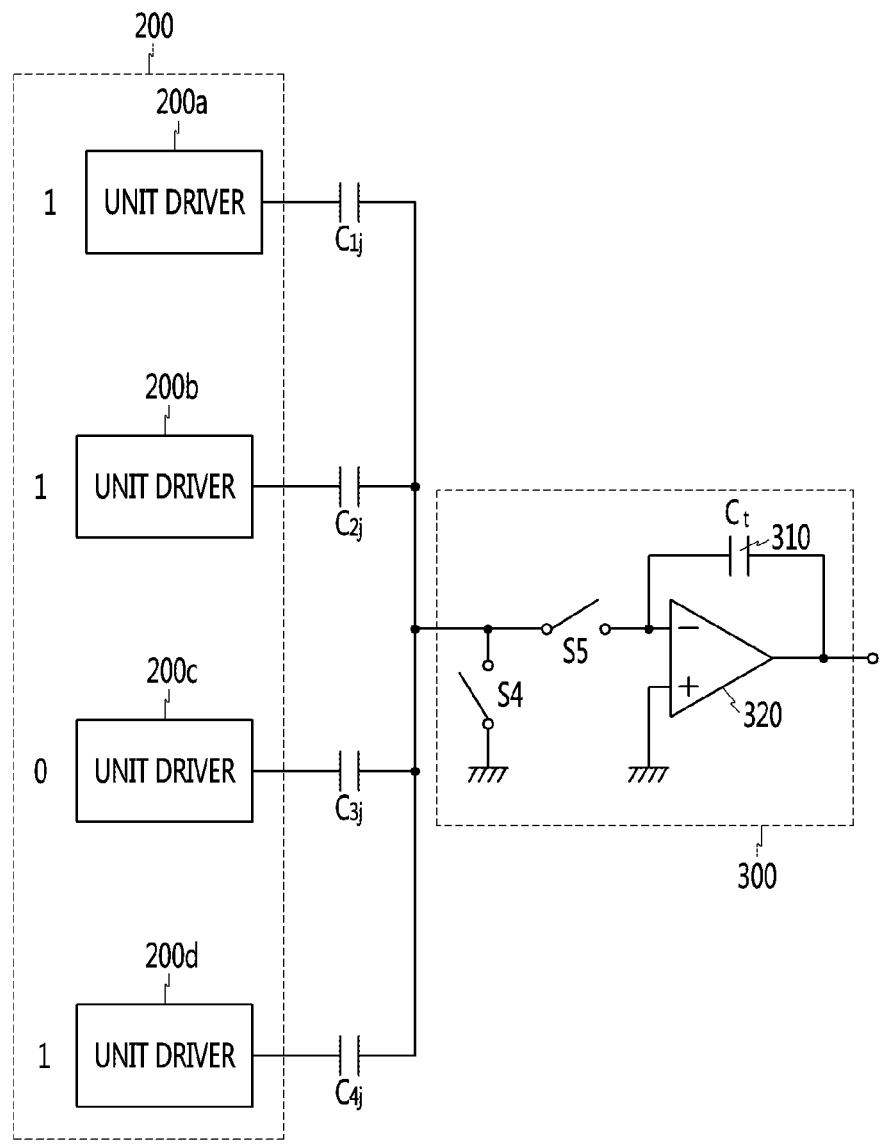
Figure 8D:
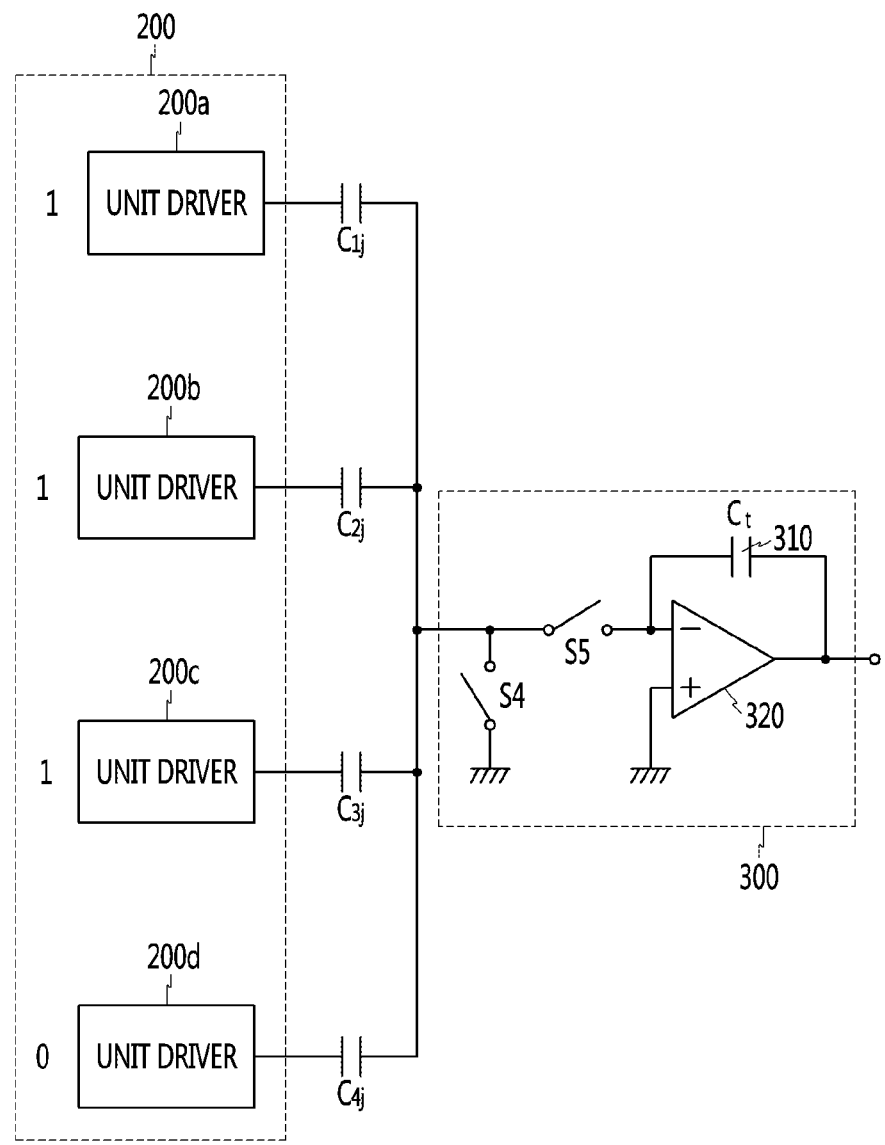

According to the driving method illustrated in FIGS. 8b to 8d, sense voltages (SV2, SV3, and SV4) delivered from the node capacitors to the integration capacitor Ct at time points t2, t3, and t4, respectively, are represented by equation 3.

$$SV2=k*(C1j-C2j+C3j+C4j)$$

$$SV3=k*(C1j+C2j-C3j+C4j)$$

$$SV4=k*(C1j+C2j+C3j-C4j)$$

The sense voltages (SV1, SV2, SV3, and SV4) sensed by the sensing circuit 300 at respective driving time points as expressed in equations 2 and 3 are added or subtracted, thus calculating the capacitances C1j, C2j, C3j, and C4j of the node capacitors according to equation 4.

$$C1j = \frac{1}{4k}*(-SV1+SV2+SV3+SV4)$$ (Equation 4)

$$C2j = \frac{1}{4k}*(SV1-SV2+SV3+SV4)$$

$$C3j = \frac{1}{4k}*(SV1+SV2-SV3+SV4)$$

$$C4j = \frac{1}{4k}*(SV1+SV2+SV3-SV4)$$

In order words, according to an exemplary embodiment of the present invention, the sense detector 500 stores the sense voltages (SV1, SV2, SV3, and SV4) sensed by the sensing circuit 300 at respective driving time points in a memory (not shown) and then adds or subtracts the sense voltages (SV1, SV2, SV3, and SV4) in predetermined sequences, thus calculating the capacitances C1j, C2j, C3j, and C4j of the node capacitors according to equation 4. In an embodiment, the sequence of addition and subtraction performed by the sense detector 500 may be the same as the sequence of waveforms applied to the corresponding operation signal line.

For example, when the unit driver 200a applying waveforms to the operation signal line X1 at respective driving time points t1 to t4 is driven in the binary sequence of 0111, the sense detector 500 adds and subtracts the sense voltages (SV1, SV2, SV3, and SV4) in the order of "−, +, +, +," respectively. Thus, the node capacitance C1j corresponding to the unit driver 200a can be measured. Also, it can be seen that the node capacitances C2j, C3j, and C4j corresponding to the unit drivers 200b, 200c, and 200d are calculated by adding or subtracting the sense voltages (SV1, SV2, SV3, and SV4) in binary sequences corresponding to driving binary sequences of the respective unit drivers 200b, 200c, and 200d.

Unlike a conventional method of sequentially driving node capacitors and then sequentially measuring capacitances of the node capacitors, a method according to an exemplary embodiment of the present invention simultaneously drives a plurality of unit drivers with driving waveforms having a predetermined binary sequence at any driving time points, measures a sense voltage delivered from respective node capacitors to a single integration capacitor, and calculates the node capacitances using the sense detector, thereby advantageously reducing a driving time.

Also, a driving method according to an exemplary embodiment of the present invention measures the respective node capacitances by operating the sense voltages in a binary sequence that is the same as a binary sequence used to drive the plurality of node capacitors at any driving time point, which is an implementation of autocorrelation.

Although 4 unit drivers were described as being driven with a binary sequence of 0111 having perfect orthogonality, the present invention is not limited thereto, and 4 or more unit drivers may be driven with a binary sequence having good orthogonality such as a Barker sequence. In an embodiment, the binary sequence may be a sequence where the maximum absolute value of off-peak autocorrelation values is 2, or a binary sequence where the ratio between the magnitude of the peak autocorrelation value and the largest off-peak autocorrelation value is at least 2:1. In embodiments, the ratio between the peak autocorrelation value and the largest off-peak autocorrelation value is at least 3:1, 4:1, 5:1, 7:1, 11:1, or 13:1.

The exemplary embodiment of the present invention may be generalized and expressed as equation 5 similarly to equations 2 and 3 when a touch screen device having n unit drivers is driven.

$$V=kAC$$ (Equation 5)

Where V is an n×1 matrix, which indicates voltages delivered by the plurality of node capacitors to the single integration capacitor and sensed by the sensing circuit at driving time points, k is a ratio of the source voltage VDD and the capacitance Ct of the single integration capacitor, A is an n×n matrix of 1s and −1s, and C is an n×1 matrix corresponding to the capacitances of the node capacitors. In this case, "1" of the matrix A denotes the first drive mode (for applying the positive source voltage to the node capacitor), and "−1" of the matrix A denotes the second drive mode (for applying the negative source voltage to the node capacitor).

The matrix C of the capacitances of the node capacitors may be calculated according to equation 6 below, which is derived from equation 5.

$$C = \frac{1}{k}A^{-1}V$$ (Equation 6)

Where $A^{-1}$ is the inverse matrix of A.

Accordingly, as seen from equation 6, the node capacitance can be calculated by adding or subtracting the sense voltages in the sequence obtained by the inverse matrix of the matrix A of −1s and 1s.

If the node capacitors are driven with the matrix A satisfying equation 7 below at driving time points, a driving method according to an exemplary embodiment of the present invention may measure the respective node capacitances by calculating the sense voltages in the same binary sequence as a binary sequence used to drive a plurality of node capacitors at each driving time point (namely, using autocorrelation), thereby removing effects of external noise.

$$A^2=nI$$ (Equation 7)

(where n is an integer, and I is an n×n unit matrix.)

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

| <Description of symbols> | |
|---|---|
| 100: TOUCH PANEL | 200: DRIVING CIRCUIT |
| 300: SENSING CIRCUIT | 400: TIMING CONTROLLER |
| 500: SENSE DETECTOR | 112: NODE CAPACITOR |
| 310: INTEGRATION CAPACITOR | 320: OPERATIONAL AMPLIFIER |

What is claimed is:

1. A driving device for a touch panel comprising a plurality of operation signal lines, a sense signal line insulated from the plurality of operation signal lines, and a plurality of node capacitors formed by the plurality of operation signal lines and the sense signal line, the driving device comprising:
   a driving circuit; a sensing circuit; and a sense detector, wherein,
   the plurality of node capacitors are configured to be charged during a charging operation and discharged during a discharging operation,
   the driving circuit is configured to simultaneously output a plurality of driving waveforms to corresponding ones of the plurality of operation signal lines,
   at each of a plurality of predetermined driving time points, each of the plurality of driving waveforms delivers a predetermined mode of waveform,
   the predetermined mode of waveform is either a first-mode driving waveform or a second-mode driving waveform,
   the first-mode driving waveform is for charging a corresponding one of the plurality of node capacitors with a voltage higher than a reference voltage during the charging operation,
   the second-mode driving waveform is for charging a corresponding one of the plurality of node capacitors with a voltage lower than the reference voltage during the charging operation,
   the sensing circuit is coupled to the sense signal line and configured to measure a plurality of sense voltages at a plurality of corresponding time points by using currents flowing though the sense signal line, and
   the sense detector is configured to add one of the plurality of sense voltages to another one of the plurality of sense voltages or subtract the one from the another one to measure capacitances of the node capacitors.

2. The driving device of claim 1, wherein the discharging operation occurs subsequently to the charging operation.

3. The driving device of claim 1, wherein,
   when the first-mode driving waveform is indicated by a binary number '1' or '0', and the second-mode driving waveform is indicated by another binary number different from the binary number,
   at any one of the predetermined driving time points, the plurality of driving waveforms deliver a plurality of predetermined modes of waveform in a predetermined binary sequence, and
   the sense detector is configured to add the one to the another one or subtract the one from the another one on the basis of the predetermined binary sequence.

4. The driving device of claim 3, wherein,
   one of the plurality of driving waveforms is formed by sequentially combining a first plurality of predetermined modes of waveform in a first predetermined binary time-sequence,
   another one of the plurality of driving waveforms is formed by sequentially combining a second plurality of predetermined modes of waveform in a second predetermined binary time-sequence different from the first predetermined binary time-sequence, and
   the one of the plurality of driving waveforms is orthogonal to the another one of the plurality of driving waveforms.

5. The driving device of claim 3, wherein,
   a plurality of binary time-sequences for producing corresponding ones of the plurality of driving waveforms are determined such that a measurement of the capacitances of the node capacitors is performed by adding the one of the plurality of sense voltages to the another one of the plurality of sense voltages or subtracting the one from the another one.

6. The driving device of claim 1, wherein,
   the driving circuit comprises a plurality of unit drivers applying the plurality of driving waveforms to the corresponding ones of the plurality of operation signal lines, and
   each of the plurality of unit drivers comprises:
      a first driving switch configured to electrically connect between a potential higher than the reference voltage and a corresponding one of the plurality of operation signal lines;
      a second driving switch configured to electrically connect between the reference voltage and the corresponding one of the plurality of operation signal lines; and
      a third driving switch configured to electrically connect between a potential lower than the reference voltage and the corresponding one of the plurality of operation signal lines.

7. The driving device of claim 6,
   wherein, the sensing circuit comprises:
      an integration capacitor;
      a first sensing switch configured to electrically connect between an intermediate voltage and the sense signal line; and
      a second sensing switch configured to electrically connect between the integration capacitor and the sense signal line for delivering charges flowing through the sense signal line during the discharging operation, and
   wherein, the driving device is configured to control a state of the first sensing switch and the second sensing switch so that the plurality of node capacitors are charged with the first-mode driving waveform or the second-mode driving waveform during the charging operation and so that the integration capacitor is charged with the charges flowing through the sense signal line during the discharging operation.

8. The driving device of claim 7, wherein, the reference voltage equals to a ground voltage, and the intermediate voltage equals to the ground voltage.

9. A touch screen device comprising:
   a touch panel comprising a plurality of operation signal lines, a sense signal line insulated from the plurality of operation signal lines, and a plurality of node capacitors formed by the plurality of operation signal lines and the sense signal line; and
   a driving device comprising:
      a driving circuit a sensing circuit and a sense detector, wherein,
      the plurality of node capacitors are configured to be charged during a charging operation and discharged during a discharging operation,
      the driving circuit is configured to simultaneously output a plurality of driving waveforms to corresponding ones of the plurality of operation signal lines, at each of a plurality of predetermined driving time points, each of the plurality of driving waveforms delivers a predetermined mode of waveform, the predetermined mode of waveform is either a first-mode driving waveform or a second-mode driving waveform, the first-mode driving waveform is for charging a corresponding one of the plurality of node capacitors with a voltage higher than a reference voltage during the charging operation, the second-mode driving waveform is for charging a corresponding one of the plurality of node capacitors with a voltage lower than the reference voltage during the charging operation, the sensing circuit is coupled to the sense signal line and configured to measure a plurality of sense voltages at a plurality of corresponding time points by using currents flowing though the sense signal line, and the sense detector is configured to add one of the plurality of sense voltages to another one of the plurality of sense voltages or subtract the one from the another one to measure capacitances of the node capacitors.

10. A method for sensing a touch input to a touch panel comprising a plurality of operation signal lines, a sense signal line insulated from the plurality of operation signal lines, and a plurality of node capacitors formed by the plurality of operation signal lines and the sense signal line, by using a driving device comprising a driving circuit, a sensing circuit, and a sense detector, the method comprising:

by the driving circuit, simultaneously outputting a plurality of driving waveforms to corresponding ones of the plurality of operation signal lines;

by the sensing circuit, measuring a plurality of sense voltages at a plurality of corresponding time points by using currents flowing though the sense signal line; and by the sense detector, adding one of the plurality of sense voltages to another one of the plurality of sense voltages or subtracting the one from the another one to measure capacitances of the node capacitors, wherein, the plurality of node capacitors are configured to be charged during a charging operation and discharged during a discharging operation, at each of a plurality of predetermined driving time points, each of the plurality of driving waveforms delivers a predetermined mode of waveform, the predetermined mode of waveform is either a first-mode driving waveform or a second-mode driving waveform, the first-mode driving waveform is for charging a corresponding one of the plurality of node capacitors with a first voltage higher than a reference voltage during the charging operation, the second-mode driving waveform is for charging a corresponding one of the plurality of node capacitors with a second voltage lower than the reference voltage during the charging operation, and the sensing circuit is coupled to the sense signal line.

11. The method of claim 10, wherein, when the first-mode driving waveform is indicated by a binary number '1' or '0', and the second-mode driving waveform is indicated by another binary number different from the binary number, at any one of the predetermined driving time points, the plurality of driving waveforms deliver a plurality of predetermined modes of waveform predetermined binary sequence, and the sense detector is configured to add the one to the another one or subtract the one from the another one on the basis of the predetermined binary sequence.

12. The method of claim 10, wherein, the first voltage is higher than the reference voltage by a predetermined level, the second voltage is lower than the reference voltage by the predetermined level, and during the charging operation, an n×1 matrix C corresponding to the capacitances of the plurality of node capacitors satisfies the following equation:

$$C = \frac{1}{k}A^{-1}V,$$

where V is an n×1 matrix indicating the plurality of sense voltages, k is a ratio of the predetermined level and a capacitance value of an integration capacitor accumulating charges flowing through the sense signal line, and A is an n×n matrix of 1s and −1s.

13. The method of claim 12, wherein, the matrix A satisfies the following equation:

$A^2 = nI$, where n is an integer, and I is an n×n unit matrix.

* * * * *